(12) United States Patent
Estaphan et al.

(10) Patent No.: US 6,683,819 B1
(45) Date of Patent: Jan. 27, 2004

(54) SONAR ARRAY SYSTEM

(75) Inventors: Michelle K. Estaphan, Jamestown, RI (US); Frederick J. Frodyma, Tiverton, RI (US); Guy T. Railey, Middletown, RI (US); Daniel M. Viccione, Westerly, RI (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/348,517

(22) Filed: Jan. 21, 2003

(51) Int. Cl.[7] ................................................ G01S 15/00
(52) U.S. Cl. .................................................... 367/106
(58) Field of Search ..................... 174/101.5; 367/20, 367/153, 154, 106, 130

(56) References Cited

U.S. PATENT DOCUMENTS

| | | | |
|---|---|---|---|
| 4,234,939 A | * | 11/1980 | Grall .......................... 367/99 |
| 4,596,007 A | * | 6/1986 | Grall et al. .................. 367/92 |
| 4,716,556 A | | 12/1987 | Raskin et al. |
| 4,961,174 A | | 10/1990 | Teel et al. |
| 5,168,471 A | | 12/1992 | Parra |
| 5,220,537 A | | 6/1993 | Sullivan |
| 5,229,977 A | | 7/1993 | Owen |
| 5,367,497 A | | 11/1994 | Marschall |
| 5,377,166 A | | 12/1994 | Kuhn |
| 5,668,775 A | * | 9/1997 | Hatteland .................. 367/130 |
| 5,673,236 A | | 9/1997 | Barger |
| 5,841,733 A | | 11/1998 | Bouyoucos et al. |
| 5,856,954 A | * | 1/1999 | Grall .......................... 367/106 |
| 5,909,408 A | | 6/1999 | Warnan et al. |
| 6,002,644 A | * | 12/1999 | Wilk .......................... 367/106 |
| 6,088,296 A | * | 7/2000 | Seaman et al. ............. 367/106 |
| 6,370,085 B1 | | 4/2002 | Finkle et al. |

\* cited by examiner

Primary Examiner—Ian J. Lobo
(74) Attorney, Agent, or Firm—Daly, Crowley & Mofford, LLP

(57) ABSTRACT

The sonar array system includes a receive array of hydrophones and a transmit array of acoustic projectors disposed on a common axis. The sonar array system can be coupled to a ship and deployed and recovered from a single winch and through a single ship hull penetrator. When towed through water by the ship, the sonar array system provides a substantially horizontal transmit/receive array.

31 Claims, 3 Drawing Sheets

SONAR ARRAY SYSTEM

CROSS REFERENCE TO RELATED APPLICATIONS

Not Applicable.

STATEMENT REGARDING FEDERALLY SPONSORED RESEARCH

Not Applicable.

1. Field of the Invention

This invention relates generally to sonar apparatus and in particular to sonar arrays used underwater.

2. Background of the Invention

A ship, for example a military ship, can tow an array of sound receiving hydrophones arranged as a passive towed array. The passive towed array, in conjunction with sound receiving and signal processing electronics, can detect sounds in the water that may indicate, for example, the presence of an enemy submarine.

In other arrangements, the ship can tow both the passive towed array of sound receiving hydrophones and also a towed acoustic projector, which together form a bistatic active sonar system. With this arrangement, the towed acoustic projector emits sound pulses. Each sound pulse travels through the water, striking objects or targets in the water, which produce echoes. The echoes are received by the towed array of receiving hydrophones. Therefore, an echo indicates the presence of an underwater object, and the direction from which the echo came indicates the direction of the underwater object.

In conventional bistatic active sonar systems, the towed acoustic projector is often deployed and towed separately from the towed array of sound receiving hydrophones. A conventional towed acoustic projector typically includes a sound source mounted within a large rigid tow body, for example in a conventional AN/SQS-35 tow body used by the United States Navy. The conventional towed acoustic projector is large and heavy. For example, the size can be on the order of forty-eight cubic feet and the weight can be on the order of 4000 pounds. The towed acoustic projector of this type is typically used to detect objects in deep water and at long ranges. Therefore, the towed acoustic projector is capable of generating sound having a high sound pressure level, for example 220 decibels relative to one microPascal at one meter (also written herein as dB re 1 $\mu$Pa at 1 m) in order to enable the system to receive echoes from and therefore to detect objects in the deep water at long ranges. This type of bistatic active sonar system is not well suited to littoral waters having a shallower depth.

The towed array of receiving hydrophones are often deployed and recovered through a hull penetrator below the ship water line. In contrast, in part due to its size and weight, the towed acoustic projector is deployed and recovered over the gunwale of the ship with winch and boom equipment. The large towed acoustic projector, which requires deployment over the gunwale of the ship, limits covert deployment and recovery. The deployment and recovery of the towed acoustic projector over the gunwale of the ship may also be unwieldy and dangerous during deployment and recovery in high seas.

Conventional bistatic active towed array systems are configured such that the acoustic projector is handled with equipment separate from equipment that handles the towed array of receiving hydrophones. Large handling equipment is needed to deploy and recover the towed acoustic projector. The large handling equipment requires a considerable amount of deck space on a ship. The large handling equipment is undesirable not only because of the deck space that it requires, but also because it presents a radar target having a large radar cross section to enemy radar systems.

It would, therefore, be desirable to provide a system that has an array of receiving hydrophones as well as a towed acoustic projector both of which can be deployed and recovered using a single set of handling equipment. It would be further desirable to provide a sonar system that has the array of receiving hydrophones as well as the towed acoustic projector both of which can be deployed and recovered through a single ship hull penetrator. It would be further desirable to provide a sonar system that is suited for operation in littoral waters having a relatively shallow depth.

SUMMARY OF THE INVENTION

The present invention provides a sonar array having both a receive array and a transmit array coupled to a single tow cable. The acoustic projectors used in the transmit array are capable of producing a high sound pressure level (SPL) while having a small size.

In accordance with the present invention, a sonar, array has a transmit array and a receive array to form a "reelable" single line array. The transmit array has one or more acoustic projectors capable of generating sound and the receive array has one or more hydrophones capable of receiving sound. The one or more acoustic projectors are disposed on a transmit array axis, and the one or more hydrophones are disposed on a receive array axis. The receive array axis and the transmit array axis have a common axis, therefore forming contiguous line arrays, one for transmitting and for receiving. In one particular embodiment, at least one of the acoustic projectors can include a slotted cylinder transducer. In one configuration, the sonar array can be towed to form a horizontal line array having both acoustic projectors and hydrophones.

With this particular arrangement, the acoustic projectors and the hydrophones can be deployed and recovered from a single winch. The slotted cylinder arrangement allows each of the acoustic projectors to be relatively small and light, therefore, a relatively small winch can be used to deploy and recover the sonar array.

In accordance with another aspect of the present invention, a method for detecting underwater objects includes deploying a sonar array from a single winch, the sonar array including both a transmit array and a receive array. The transmit array has one or more acoustic projectors capable of generating sound and the receive array has one or more hydrophones capable of receiving sound, all arranged on a common axis. The method also includes recovering the sonar array from the single winch. The deployment and recovery can either be via a ship hull penetrator, or over a gunwale of a ship.

With this particular arrangement, the method allows deployment and recovery of the sonar system from a single winch. The deployment and recovery can be done covertly with a single ship hull penetrator.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
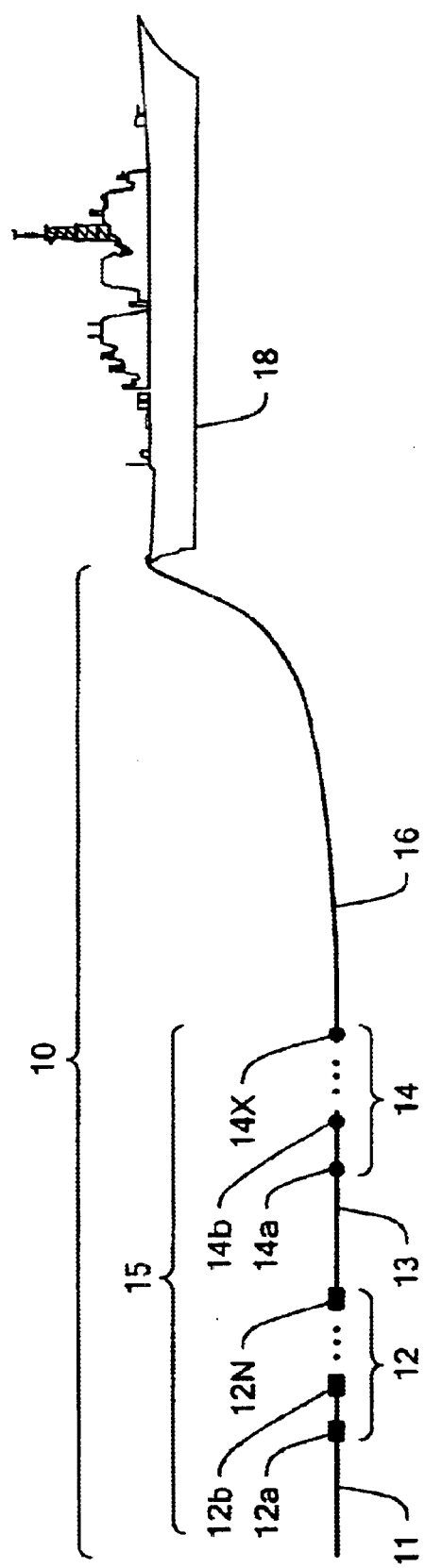
FIG. 1 is a pictorial of a sonar array system in accordance with the present invention.

Referring now to FIG. 1, a sonar array system 10 in accordance with the present invention includes a receive array 14 having one or more hydrophones 14a–14X. The one or more hydrophones 14a–14X are disposed along on a receive array axis to form a linear receive array.

The sonar array system 10 also includes a transmit array 12 coupled to the receive array 14 with a separator cable 13. The transmit array 12 includes one or more acoustic projectors 12a–12N. The one or more acoustic projectors 12a–12N are disposed along a transmit array axis to form a linear transmit array. The receive array axis and the transmit array axis are arranged along a common axis, therefore forming a contiguous transmit/receive array 15 having both the acoustic projectors 12a–12N and the hydrophones 14a–14X.

A tow cable 16 couples the transmit/receive array 15 to the ship 18. The tow cable 16 provides a mechanical coupling between the ship 18 and the receive array 14. The tow cable also provides electrical connections between the ship 18 and the receive array 14, some of which pass through the receive array 14 to the transmit array 12. The electrical connections can be wire connections or fiber optic connections or a combination of both wire connections and fiber optic connections.

In operation, when towed through the water by the ship 18 at sufficient speed, the transmit/receive array 15 maintains a generally horizontal orientation due to hydrodynamic forces that operate on the transmit/receive array 15. It should be recognized that as the ship 18 turns, the transmit/receive array 15 can curve horizontally in accordance with the turning ship, while maintaining a common axis for the transmit array 12 and the receive array 14.

In order to generate further hydrodynamic forces to keep the combination of the transmit/receive array 15 more nearly horizontal, a drogue line 11 can be coupled to the transmit array 12. The drogue line 11 provides a further drag force as it is towed though the water by the ship 18.

Each of the acoustic projectors 12a–12N generates an acoustic projector beampattern. Each acoustic projector beampattern can be substantially omidirectional, and each acoustic projector can generate sound at a particular frequency, for example a frequency in the range of 300 Hz to 4 kHz. All of the acoustic projectors 12a–12N can project sound having the same frequency and the same beampattern. However, in other embodiments, selected ones of the acoustic projectors 12a–12N project sound having a frequency lower than 300 Hz or higher than 4 kHz. Also, selected ones of the acoustic projectors 12a–12N can have a different beampattern. In still other embodiments, selected ones of the acoustic projectors 12a–12N project sound at more than one frequency, for example, in a band of frequencies.

Similarly, each of the hydrophones 14a–14X receives sound with a hydrophone beampattern. Each hydrophone beampattern can be substantially omidirectional, and each hydrophone 14a–14X can receive sound throughout a particular band of frequencies, for example a frequency band of 300 Hz to 4 kHz. All of the hydrophones 14a–14X can receive sound within the same frequency band and can have the same beampattern. However, in other embodiments, selected ones of the hydrophones 14a–14X can receive sound within a different frequency band and/or a have a different beampattern than others of the hydrophones 14a–14X. Also, in other embodiments, selected ones of the hydrophones 14a–14X can receive sound in a frequency band extending below 300 Hz and/or above 4 kHz.

In one particular embodiment, the transmit/receive array 15 has six acoustic projectors, of which the acoustic projectors 12a–12N are examples, each spaced by 60.96 centimeters center to center, and the transmit/receive array 15 has fifty-four hydrophones, of which the hydrophones 14a–14X are examples, each spaced by thirty centimeters center to center. The tow cable 16 in one particular embodiment is five hundred meters long. However, in other embodiments, the transmit/receive array 15 can have more than six or fewer than six acoustic projectors and more than fifty-four or fewer than fifty-four hydrophones. Also, in other embodiments, the acoustic projectors 12a–12N can be spaced by more than 60.96 centimeters or by less than 60.96 centimeters. In still other embodiments, the transmit array 12 is modular such that acoustic projectors can be added to or removed from the transmit/receive array 15.

One of ordinary skill in the art will appreciate that an array of acoustic projectors, for example the acoustic projectors 12a–12N within the transmitting array 12, can be used in combination with transmit beamforming electronics (not shown) to generate a steered transmit beampattern (not shown). Such a beampattern is generally conical and can be steered to a selected angle about the axis of the transmit array 12. Similarly, it should be appreciated that an array of receiving hydrophones, for example the receive hydrophones 14a–14X within the receiving array 14, can be used in combination with receive beamforming electronics (not shown) to generate a steerable receive beampattern (not shown). Like the transmit beampattern, the receive beampattern is also generally conical and can be steered to a selected angle about the axis of the receive array 12. Therefore, the beampattern of the transmit array 12 can be pointed to the same direction as the beampattern of the receive array 12. This particular arrangement can be used to enhance the detection performance of the sonar array system 10. However, in other embodiments, either of the transmit beampattern and the receive beampattern can be provided at one or more fixed angles, without steering.

While the transmit array 12 is shown to be aft of the receive array 14 relative to the ship 18, in an alternate embodiment, the receive array 14 can instead be disposed aft of the transmit array 12. In another alternate embodiment, the acoustic projectors 12a–12N and the receive hydrophones 14a–14X can be interspersed such that the acoustic projectors 12a–12N and the hydrophones 14a–14X are interspersed in any combination on a single line array.

When towed through the water at sufficient speed by the ship 18, the transmit/receive array 15 is in a generally horizontal orientation. While the transmit/receive array 15 is shown to be in a substantially horizontal orientation, in part due to the hydrodynamic drag generated when the ship 18 tows the transmit/receive array 15 through the water, in other arrangements the transmit/receive array 15 can assume an orientation other than horizontal. For example, if the sonar array system 10 is towed at slower speeds by the ship 18, or is not towed by the ship 18, the transmit/receive array 15 can assume an orientation other than horizontal, including vertical. In other embodiments, the transmit/receive array 15 is not coupled to a ship. For example, in other embodiments, the transmit/receive array 15 is coupled to a buoy.

Figure 2:
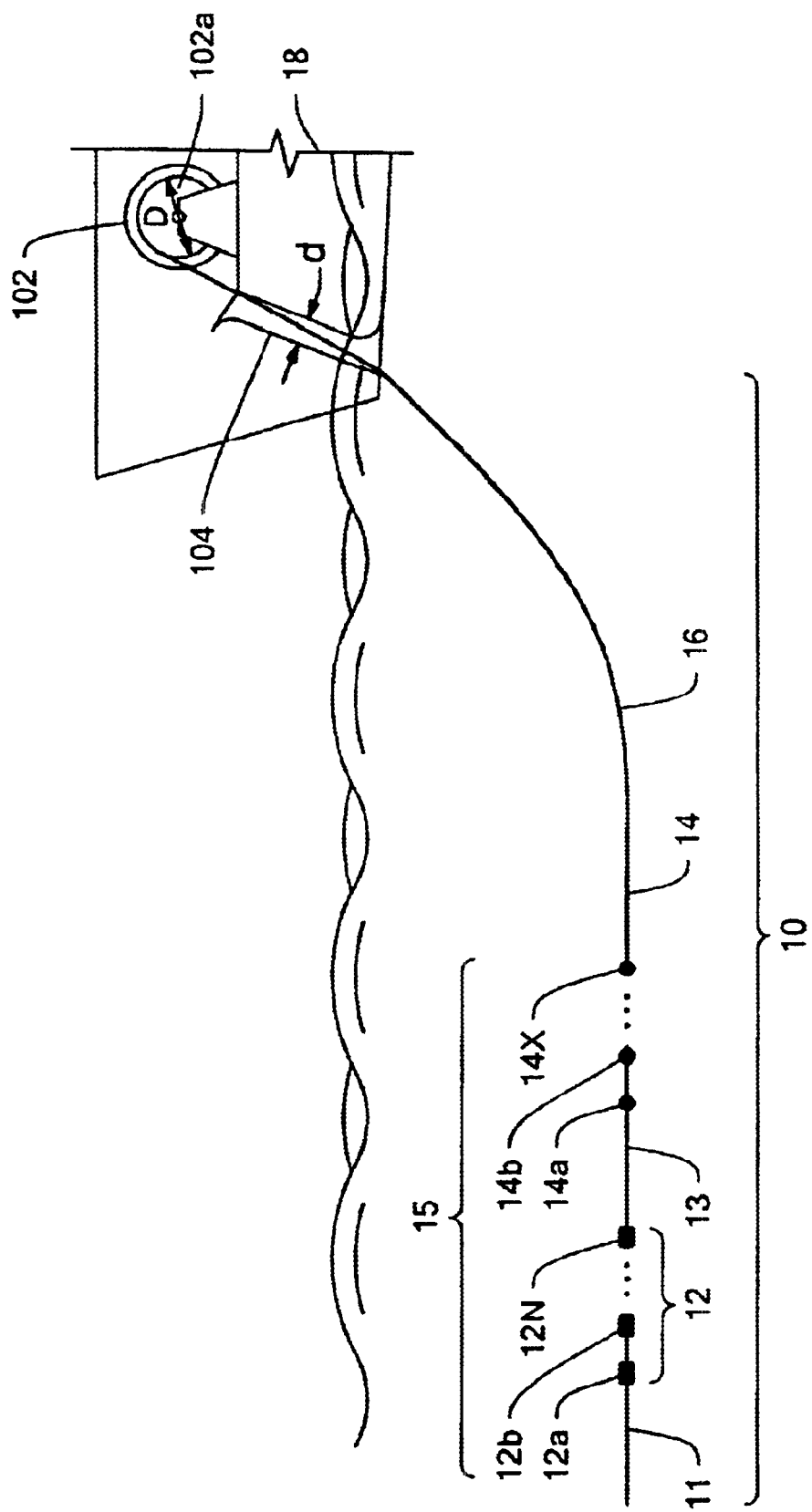
FIG. 2 is a pictorial of the sonar array system showing deployment and recovery equipment.

Referring now to FIG. 2, in which like elements of FIG. 1 are shown having like reference designations, the sonar array system 10 can be deployed and recovered by the ship 18. In particular, a single winch 102 can deploy and recover the sonar array system 10 having the transmit/receive array 15.

The sonar array system 10 can be deployed and recovered through a single hull penetrator 104. Therefore, the sonar array system 10 can be deployed and recovered covertly such that those not aboard the ship 18 cannot see the deployment and recovery of the sonar array system 10.

A variety of sizes of winches 102 can be used with this invention. In one particular embodiment, the winch 102 can include a drum hub 102a having a diameter, D, of less than or equal to fifty centimeters. In another embodiment, the drum hub 102a can have a diameter of less than or equal to thirty-eight centimeters. Those of ordinary skill in the art will recognize these to be a relatively small winches. However, in other embodiments, winches with larger drum hub diameters can be used. A minimum drum hub diameter is selected based upon a number of factors, including but not limited to, a diameter and a length of each of the acoustic projectors 12a–12N. The acoustic projectors 12a–12N are described in greater detail in conjunction with FIG. 3.

A variety of sizes of hull penetrators 104 can also be used with this invention. In one particular embodiment, the hull penetrator 104 can have a cross-sectional diameter, d, of less than or equal to twenty centimeters. In another embodiment, the hull penetrator 104 can have a cross-sectional diameter, d, of less than or equal to 15.24 centimeters. Those of ordinary skill in the art will recognize these to be relatively small diameter hull penetrators for sonar systems deployed from a surface ship. However, in other embodiments, hull penetrators with larger or smaller cross-sectional diameters can be used. A minimum hull penetrator diameter is selected based upon a number of factors, including but not limited to, a diameter of each of the acoustic projectors 12a–12N.

Figure 3:
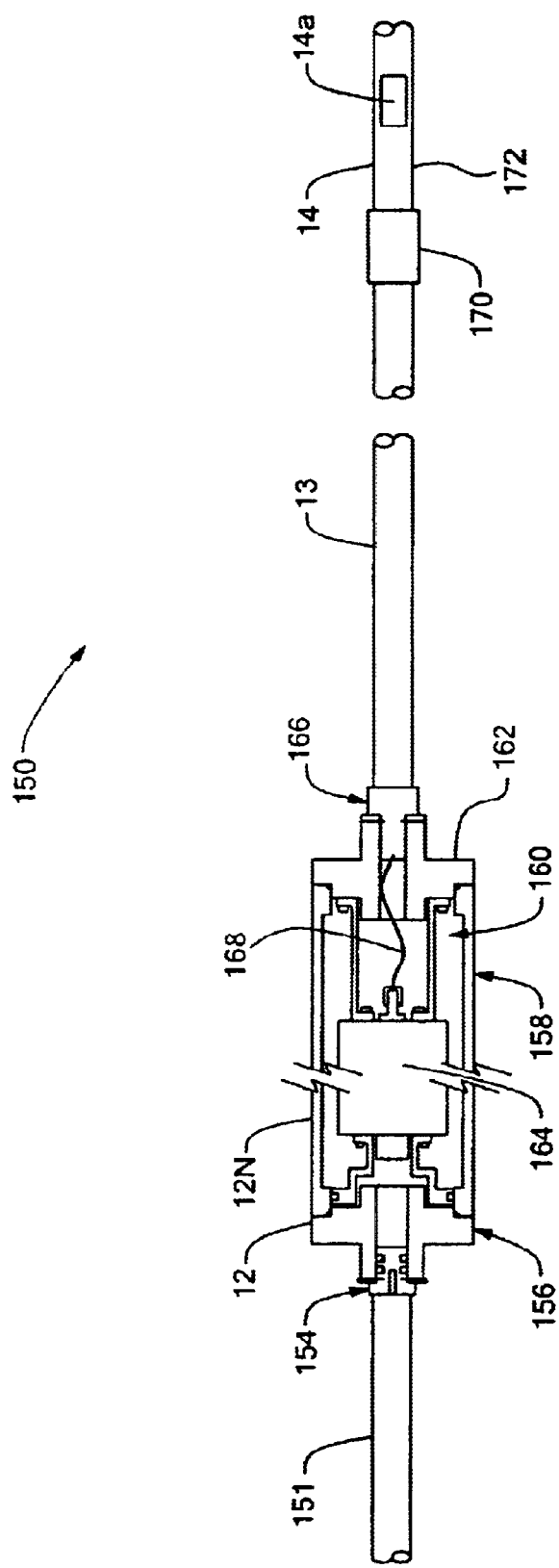
FIG. 3 is a pictorial showing a portion of the sonar array system of FIGS. 1 and 2.

Referring now to FIG. 3, in which like elements of FIGS. 1 and 2 are shown having like reference designations, a portion 150 of the transmit/receive array 15 (FIG. 1) includes a transmit array 12 having one or more acoustic projectors 12a–12N (FIG. 1), including the acoustic projector 12N. A transmit array cable section 151, couples the acoustic projector 12N to the acoustic projector 12b (FIG. 1). Taking the acoustic projector 12N as representative of all such acoustic projectors, the acoustic projector 12N includes an aft connector plug 154 for coupling to the transmit array cable section 151. The acoustic projector 12a includes an aft end cap 156, which is sealed with O-rings or the like to a projector housing 158. The projector housing 158 can have a cylindrical shape. A fore end cap 162 is also sealed to the projector housing 160 with O-rings or the like and a fore connector plug 166 couples the acoustic projector 12N to a separator cable 13. The acoustic projector 12N is therefore sealed to provide a watertight compartment 160. The watertight compartment 160 can be either filled with a gas in some embodiments, or can be filled with acoustically conductive fluid, for example castor oil, in other embodiments. A sound projecting transducer 164, also simply referred to herein as a transducer 164, can be disposed within the watertight compartment 160. The transducer 164 is coupled to the separator cable 13 with wires 168, which pass through the separator cable 13.

The acoustic projector 12N is coupled to the separator cable 13, which couples the transmit array 12 to the receive array 14. The separator cable 13 is coupled to the receive array 14 with a waterproof connector 170.

The receive array 14 (FIG. 1) has the one or more hydrophones 14a–14X (FIG. 1), including the hydrophone 14a. In one particular embodiment, the receive array can be comprised of a tube 172 in which the one or more hydrophones 14a–14X (FIG. 1) are disposed. The tube 172 can be filled with a fluid, for example castor oil.

The transmit array cable 151, the separator cable 13, and the receive array 14 can include fiber optic couplings that carry transmit signals to the acoustic projectors 12a–12N (FIG. 1) and receive signals from the hydrophones 14a–14X (FIG. 1). In other embodiments, the transmit array cable 151, the separator cable 13, and the receive array 14 include wire conductors. In other embodiments, the transmit array cable 151, the separator cable 13, and the receive array 14 include both wire conductors and fiber optic couplings.

The transducer 164 can be a slotted cylinder transducer 164, which is adapted to generate sound from the acoustic projector 12N having a sound pressure level of at least 205 decibels relative to one micropascal and one meter (also written herein as dB re 1 $\mu$Pa at 1 m). However, it should be appreciated that other types of transducers 164 known to one of ordinary skill in the art can also be used, and the invention is not limited to only slotted cylinder transducers. Furthermore, the acoustic projector 12N can generate sound having a sound pressure level of greater than or less than 205 dB re 1 $\mu$Pa at 1 m. In one particular embodiment, the acoustic projector 12N generates an acoustic beampattern having an essentially omnidirectional shape. However, in other embodiments, the acoustic projector 12N can have a directional beampattern.

Because of the desire to be able to deploy and recover the transmit/receive array 10 of FIG. 2 from a single winch (102, FIG. 2) having a small hub diameter (D, FIG. 2) as described above, it is desirable that the acoustic projectors, e.g. the acoustic projector 12N, be small, both in diameter and in length.

In one particular embodiment, the acoustic projector has a diameter of 15.24 centimeters, a length of thirty-eight centimeters, and the transducer 164 is a slotted cylinder transducer having a diameter of ten centimeters and a length of twenty centimeters. With this particular arrangement, the acoustic projector 12N generates sound having a sound pressure level of at least 205 dB re 1 $\mu$Pa at 1 m while maintaining a small acoustic projector size that can be deployed and recovered from the winch (102, FIG. 2) having a relatively small hub diameter, D (FIG. 2), as described above. However, in other embodiments the acoustic projector can have a diameter greater than or less than 15.24 centimeters and a length greater than or less than thirty-eight centimeters. Also, the transducer can have a diameter greater than or less than ten centimeters and a length greater than or less than twenty centimeters.

In one particular embodiment, the transducer 164 generates sound having a frequency of 3 KHz. However, in other embodiments, the transducer 164 can be adapted to generate sound having a frequency greater than or less than 3 kHz.

It will be appreciated that the hydrophones, for example the hydrophone 14a, included in the receive array 14 (FIG. 1) can be smaller than the acoustic projectors, for example the acoustic projector 12N, that are included in the transmit array 12 (FIG. 1). Therefore, the receive array 14 can have a smaller diameter than the acoustic projector 12N. In one particular embodiment, the receive array 14 has a largest diameter that is approximately the same as the largest diameter of the acoustic projector 12N. In another particular embodiment, the receive array 14 has a largest diameter that is approximately one half of the largest diameter of the acoustic projector 12N. In still other embodiments, the receive array 14 has a largest diameter that is another proportion smaller than of the largest diameter of the acoustic projector 12N.

While the acoustic projectors 12N is shown and described as having a transducer 164 within a sealed cavity 160, acoustic projectors having other arrangements are possible with this invention. For example, in other embodiments, the acoustic projector 12N comprises a transducer 164 in a potted or molded waterproof body. Also, while the receive array 14 is shown and described to include a tube 172, in other embodiments, the one ore more hydrophones, or which the hydrophone 14a is one example, are separately potted or molded so as to be waterproof and are coupled together without the tube 172.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A sonar array, comprising:
    a transmit array having one or more acoustic projectors, wherein the one or more acoustic projectors are disposed along a transmit array axis; and
    a receive array coupled to said transmit array, said receive array having one or more hydrophones disposed along a receive array axis, the receive array axis and the transmit array axis having a common axis, and wherein said receive array and said transmit array are adapted to be deployed from and recovered by a single winching coupled to a ship.

2. The sonar array of claim 1, wherein the transmit array axis and the receive array axis are substantially horizontal.

3. The sonar array of claim 1, wherein the single winching apparatus has a drum hub diameter less than or equal to fifty centimeters.

4. The sonar array of claim 1, wherein the single winching apparatus has a drum hub diameter less than or equal to thirty-eight centimeters.

5. The sonar array of claim 1, wherein said receive array and said transmit array are adapted to be deployed and recovered through a single ship hull penetrator.

6. The method of claim 5, wherein the single ship hull penetrator has a smallest diameter less than or equal to twenty centimeters.

7. The method of claim 5, wherein the single ship hull penetrator has a smallest diameter less than or equal to 15.24 centimeters.

8. The sonar array of claim 1, wherein said receive array and said transmit array are adapted to be deployed and recovered over the gunwale of a ship.

9. The sonar array of claim 1, wherein at least one of the one or more acoustic projectors is adapted to generate sound having a sound pressure level of at least 205 dB re 1 μPa at 1 meter, having a transmit beampattern that is essentially omnidirectional.

10. The sonar array of claim 9, wherein the at least one of the one or more acoustic projectors is adapted to generate sound in the frequency range of 300 Hz to 4 kHz.

11. The sonar array of claim 1, wherein the one or more acoustic projectors and the one or more hydrophones are interspersed to form a line array adapted to both transmit and receive sound.

12. The sonar array of claim 1, wherein the transmit array is adapted to transmit sound to an object to generate an echo from the object and the receive array is adapted to receive the echo in order to detect the object.

13. The sonar array of claim 1, wherein at least one of the one or more acoustic projectors includes a slotted cylinder transducer.

14. The sonar array of claim 1, wherein said transmit array has a largest diameter less than or equal to 20.32 centimeters.

15. The sonar array of claim 14, wherein said receive array has a diameter less than or equal to the largest diameter of said transmit array.

16. The sonar array of claim 14, wherein said receive array has a diameter less than or equal to half of the largest diameter of said transmit array.

17. The sonar array of claim 1, wherein said transmit array has a largest diameter less than or equal to 15.24 centimeters.

18. The sonar array of claim 17, wherein said receive array has a diameter less than or equal to the largest diameter of said transmit array.

19. The sonar array of claim 17, wherein said receive array has a diameter less than or equal to half of the largest diameter of said transmit array.

20. The sonar array of claim 1, wherein the one or more acoustic projectors are modular such that they can be added to and alternatively removed from the transmit array to provide an expandable transmit array.

21. The sonar array of claim 20, wherein the transmit array has a sound pressure level proportional to the number of acoustic projectors.

22. The sonar array of claim 1, wherein said transmit array is adapted to transmit sound in the frequency range of 300 Hz to 4 kHz.

23. The sonar array of claim 1, wherein said transmit array is capable of providing at least one steerable acoustic transmit beam.

24. The sonar array of claim 1, wherein said receive array is capable of providing at least one steerable acoustic receive beam.

25. A method for detecting underwater objects, comprising:
    deploying a sonar array from a single winching apparatus coupled to a ship, the sonar array including a transmit array having one or more acoustic projectors, wherein the one or more acoustic projectors are disposed along a transmit array axis, a receive array coupled to said transmit array, said receive array having one or more hydrophones disposed along a receive array axis, the receive array axis and the transmit array axis having a common axis; and
    recovering the sonar array with the single winching apparatus.

26. The method of claim 25, wherein the transmit array axis and the receive array axis are substantially horizontal.

27. The method of claim 25, wherein the single winching apparatus has a drum hub diameter less than or equal to fifty centimeters.

28. The method of claim 25, wherein the single winching apparatus has a drum hub diameter less than or equal to thirty-eight centimeters.

29. The method of claim 25, wherein the deploying and recovering each comprise:
    passing the sonar array through a ship hull penetrator having a smallest diameter less than or equal to twenty centimeters.

30. The method of claim 25, wherein the deploying and recovering each comprise:

passing the sonar array through a ship hull penetrator having a smallest diameter less than or equal to 15.24 centimeters.

31. The method of claim 25, wherein the deploying and recovering each comprise:

passing the sonar array over the gunwale of a ship.

* * * * *

UNITED STATES PATENT AND TRADEMARK OFFICE
CERTIFICATE OF CORRECTION

PATENT NO. : 6,683,819 B1
DATED : January 27, 2004
INVENTOR(S) : Michelle K. Estaphan It is certified that error appears in the above-identified patent and that said Letters Patent is hereby corrected as shown below:

Column 1,
Line 11, delete "1. Field of the Invention" and replace with
-- FIELD OF THE INVENTION --.
Line 15, delete "2. Background of the Invention" and replace with
-- BACKGROUND OF THE INVENTION --.

Column 3,
Line 45, delete "though the water" and replace with -- through the water --.
Lines 48 and 62, delete "omidirectional," and replace with -- omnidirectional, --.
Line 64, delete ", for example a" and replace with -- , for example, a --.

Column 4,
Line 2, delete "and/or a have" and replace with -- and/or have --.
Line 12, delete "in one particular embodiment" and replace with -- , in one particular embodiment, --.
Line 58, delete "arrangements the" and replace with -- arrangements, the --.

Column 6,
Line 45, delete "diameter, D" and replace with -- diameter D --.
Line 46, delete "embodiments" and replace with -- embodiments, --.

Column 7,
Line 4, delete "projectors" and replace with -- projector --.
Line 11, delete "ore" and replace with -- or --.

Signed and Sealed this

Fifth Day of April, 2005

JON W. DUDAS
*Director of the United States Patent and Trademark Office*